Sept. 30, 1969     G. L. COOK ET AL     3,469,901

AUTOMATICALLY ADJUSTED MIRRORS FOR TRACTOR-TRAILERS

Filed Dec. 9, 1966     2 Sheets-Sheet 1

INVENTORS
Gerald L. Cook &
William E. Presley

BY Wilkinson, Mawhinney & Theibault
ATTORNEYS

INVENTORS
Gerald L. Cook &
William E. Presley

BY Wilkinson, Mawhinney & Thibault
ATTORNEYS

United States Patent Office 3,469,901
Patented Sept. 30, 1969

3,469,901
AUTOMATICALLY ADJUSTED MIRRORS FOR TRACTOR-TRAILERS
Gerald L. Cook, Rte. 3, and Wililam E. Presley, Rte. 1, both of Stroud, Okla. 74079
Filed Dec. 9, 1966, Ser. No. 600,626
Int. Cl. G02b 5/08
U.S. Cl. 350—289        4 Claims

ABSTRACT OF THE DISCLOSURE

The present disclosure pertains to electrical means for automatically adjusting the rear view mirrors of a tractor-trailer vehicle, the operation of which electrical means is controlled by rotary movement of the fifth wheel of the vehicle when the vehicle is being turned and locking means for holding the mirrors in a predetermined position when the vehicle is being driven in a straight line.

---

The present invention relates to automatic positioned mirror for vehicles, and has for an object to provide an automatic mechanism for angularly adjusting rear view mirrors in vehicles, more particularly in tractor-trailer combinations, to enable the drive of the vehicle to have full and correct line of vision all along the line of the trailer both in straight line driving and in making turns.

Another object of the invention is to eliminate blind spots while turning short corners with a tractor and trailer.

A further object of the invention is to make automatic adjustments in mirror angularity enabling the drive to see the trailer while backing into tight places from the blind side.

A still further object of the invention is to enable the driver to position the mirror manually when ocasion demands, for instance while entering a street from an angle.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a plan view of a portion of a tractor-trailer combination showing the same in straight and turning positions respectively in full and dotted lines and illustrating a rear view mirror and operating device constructed in accordance with the present invention, and with illustration of different angular positions of the vehicle side mirror with lines of sight extending from the eye of the driver through the mirror rearwardly to the trailer in comprehensive all-embacing vision.

Figure 1:
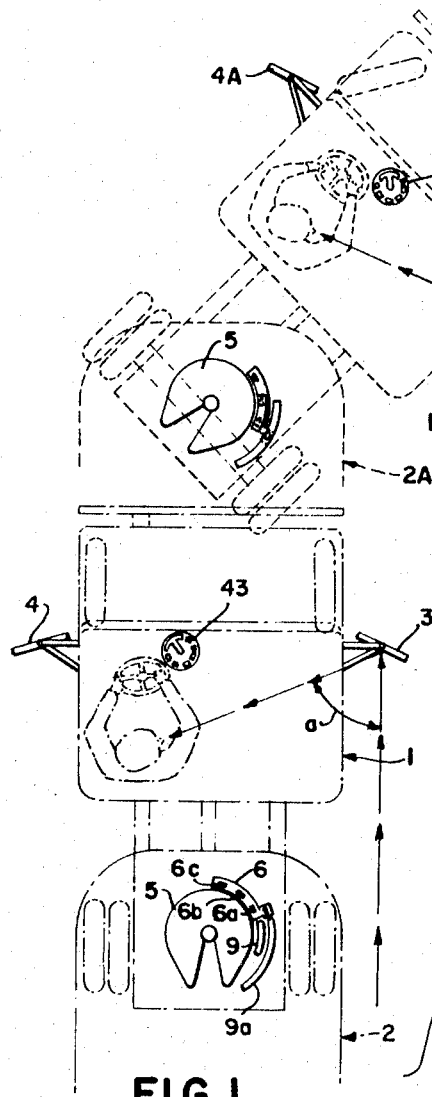

Referring more particularly to the drawings, 1 designates a tractor and 2 a trailer coupled together and moving in a straight line as shown in FIGURE 1; and 1A and 2A represent the tractor and trailer as they appear in executing a turn.

The tractor, as customary, is equipped with mirrors 3 and 4 projecting respectively from the right and left side of the cab, which mirrors, in the straight line position of the tractor-trailer combination, may be assumed to occupy the angular position indicated at 3 and 4 in FIGURE 1; whereas in the turn of the tractor as represented in this same FIGURE 1 the mirror 3 will have been moved angularly to the position roughly represented at 3A also in FIGURE 1.

In FIGURE 1 the dash lines indicate projected rays of light issuing from the trailer and striking the mirrors 3 and 3A at lines of incidence which create other lines of reflection also indicated in dash or broken lines running to the eye of the operator in the cab through angles $a$ and $b$ this being due in both positions 3 and 3A of the mirror by virtue of the angular adjustments of the mirror in the mirror brackets.

It is the function of the invention to achieve these angular movements of the mirror incident to straightaway or relative angular movements of the vehicles.

The tractor carries the usual fifth wheel 5 to which, according to the invention, is attached an arcuate insulating plate 6 carrying a number of spaced electrical contacts. Three of these contacts $6^a$, $6^b$ and $6^c$ are arranged in an arc having a common radius, while contact $6^d$ is spaced outwardly of this arc and is in a lead position relatively to the initial contact $6^a$.

Figure 6:
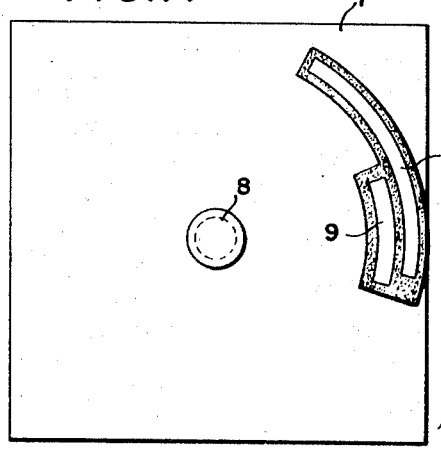
FIGURE 6 is a bottom plan view of a kingpin plate showing arcuate contact bars positioned to be contacted by the contacts $6^a$, $6^b$, $6^c$ and $6^d$ incident to turning movements of the tractor and its fifth wheel.

In FIGURE 6 is shown a kingpin plate 7 having a kingpin 8, such plate in inverted position being a part of the trailer mounted onto the fifth wheel 5 so that the fifth wheel may turn under the plate 7 in a conventional manner as turns are made by the tractor.

FIGURE 6 shows a bottom plan view of the kingpin plate 7 projecting below which is an arcuate insulated electrical conducting bar 9 shown in dotted lines in FIGURE 2 as being oriented, when the plate 7 is assembled to the fifth wheel, to be disposed in the same circular path with the contacts $6^a$, $6^b$ and $6^c$ so that the bar 9, incident to the turning of the fifth wheel 5 with turning movements of the tractor will successively engage the contacts $6^a$, $6^b$ and $6^c$.

A second arcuate electrical conducting bar $9^a$ insulated from the bar 9 and disposed in the path of the contact $6^d$ is carried by the plate 7. In the straight line position of the tractor-trailer combination the bar $9^a$ will be out of engagement with the contact $6^d$ but on initiating turning movement the bar $9^a$ will first engage contact $6^d$ before bar 9 reaches the contact $6^a$ whereby to disengage a locking device before the mirror can be angularly moved as hereinafter more fully set forth. The bar $9^a$ not only leads the bar 9 but also is much longer than bar 9 in a trailing direction to maintain the locking device in an inoperative position until the tractor-trailer returns to a straight line position.

In the straight line position of the tractor and trailer as shown at 1, 2, in FIGURE 1 the conducting bars 9 and $9^a$ are separated from their respective contacts $6^a$ and $6^d$. As the tractor turns as indicated at 1A the fifth wheel 5 will turn beneath the kingpin plate 7 so that the contact $6^d$ will first move beneath and into electrical contacting relationship with the conducting bar $9^a$ so as to unlock the locking device and subsequently in time the contact $6^a$ will move beneath and into electrical contact engagement with the companion conducting bar 9 of the plate 7 thus initiating angular movement of the mirror.

Figure 2:
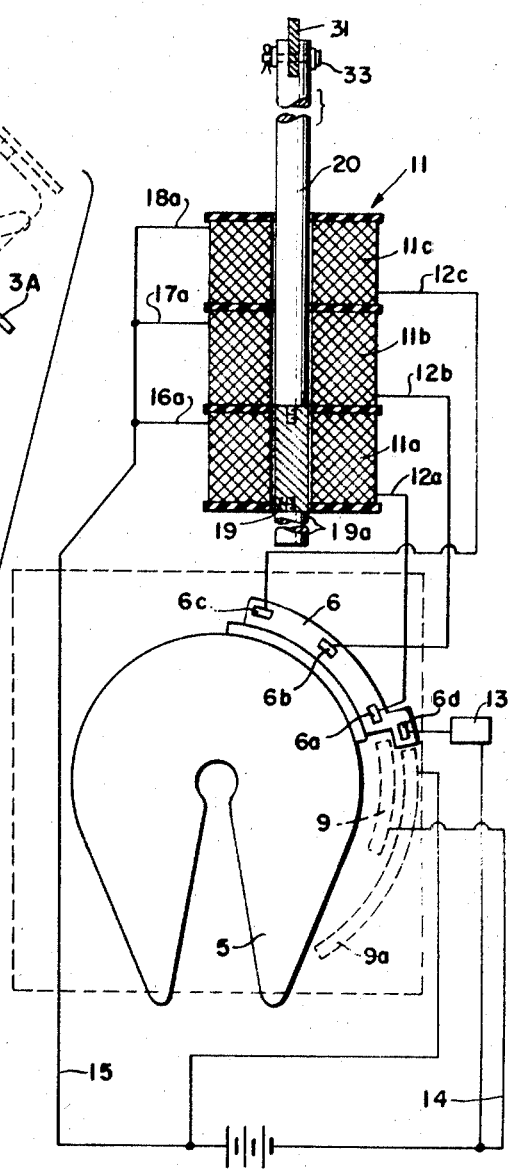
FIGURE 2 is a composite view of a tractor fifth wheel, a novel form of solenoid, switch mechanism and a circuit diagram for automatically adjusting the mirror to various angular positions automatically responsive to angularity changes in the relation of tractor and trailer.

In FIGURE 2 there is shown a sectional solenoid 11 comprising separated coils $11^a$, $11^b$ and $11^c$ which are separately connected by leads $12^a$, $12^b$, and $12^c$, respectively, to the contacts $6^a$, $6^b$ and $6^c$ of the fifth wheel plate 5. The bar 9 is connected by lead 14 to one side of a battery shown in FIGURE 2, the other side of the battery being connected by lead 15 to separate conductors $16^a$, $17^a$ and $18^a$ respectively to the other ends of the solenoid coils $11^a$, $11^b$ and $11^c$.

Figure 3:
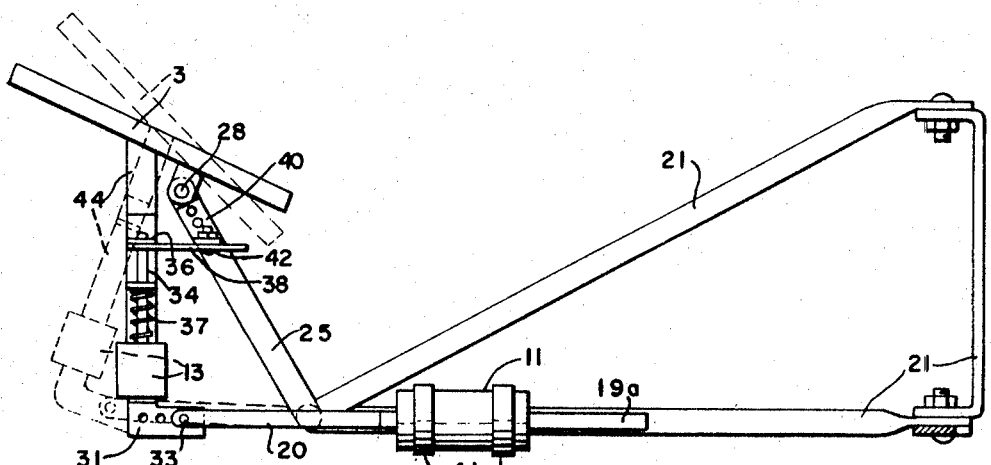
FIGURE 3 is a top plane view of a conventional type mirror with conventional type mounting on which is superposed the components of the present invention.
Figure 4:
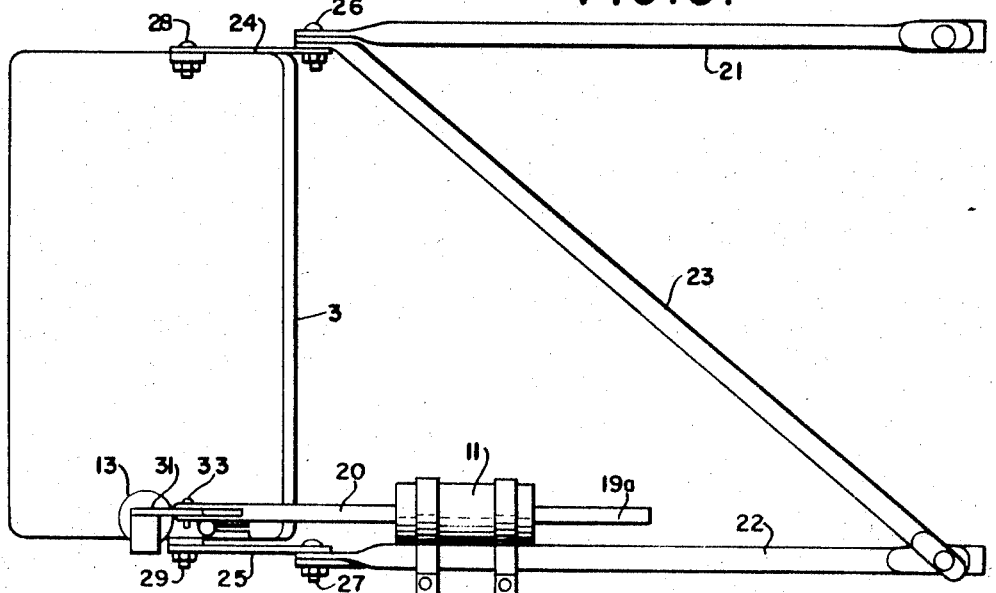
FIGURE 4 is a side elevational view of the same.
Figure 5:
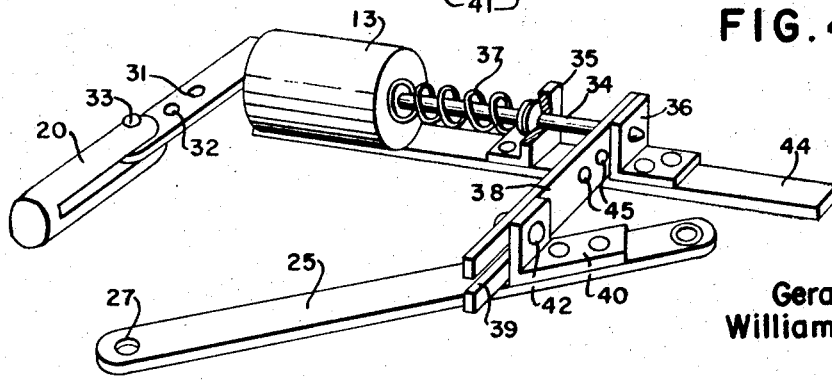
FIGURE 5 is a fragmentary perspective view showing portions of the mirror adjusting device and locking device for retaining the mirror in position for straight line driving.

A magnetic plunger 19 is movable through the several coils of the solenoid 11, such magnetic plunger 19 being connected to a non-magnetic plunger rod 20, which plunger rod is connected to a mirror operating arm 44, as shown more particularly in FIGURES 3, 4 and 5.

In FIGURES 3 and 4 a conventional mirror supporting bracket is illustrated comprising an upper substantially triangular frame 21, a lower similar frame 22 and a diagonal brace 23 connected between the two frames.

The mirror 3 is supported with pivotal movement between an upper mirror support bar 24 and a lower mirror support bar 25 which are vertically alined and are made fast to the respective upper and lower frames 21 and 22 as by nut and bolt or other suitable connections indicated at 26 and 27 which permit a proper adjustment.

The support bars 24 and 25 at ends opposite from the connections 26 and 27 preferably have bushed openings for receiving the pivot studs 28 and 29 upon which the mirror 3 is pivoted to turn about a substantially vertical axis in the act of changing to its various angular positions.

The plunger rod 20 is pivoted to a link 31 in any one of a series of perforations 32 by means of a pivot pin 33. In turn, the link 31 is affixed to the outer end of a mirror operating arm 44 which is affixed to the mirror 3 at a point offset from the axis 28. The solenoid 11 is connected by clips 41 or otherwise to a suitable member of the mirror frame 22. The solenoid 11 becomes effective through the link 31 and operating arm 44 to angularly adjust the mirror 3 about the pivot pins 28 and 29 as indicated in full and dotted lines in FIGURE 3.

A locking solenoid 13 is mounted to the mirror operating arm 44. The movable core of this solenoid 13 is connected to a locking pin 34 movable back and forth through a guide plate 35 affixed to the arm 44 and also back and forth through a striker plate 36 also made fast on the arm 44 spaced from the guide plate 35. The free end of the locking pin 34 is preferably tapered to assist in centering the same through the striker plate and also through an opening in a locking bar 38, which locking bar is adjustably carried by the lower mirror support bar 25 about which the mirror rotates.

At that end of the locking bar 38 which extends over the lower mirror support bar 25 is an elongated slot 39 preferably open at this end of the bar for the free assembly thereto of a nut and bolt connection 42 adapted to be adjusted and tightened when the perforation in the locking bar 38 is alined with the locking pin 34. The nut and bolt connection 42 is carried by an angle iron 40 riveted or otherwise affixed to the lower mirror support bar 25.

As seen in FIGURE 5 the guide plate 35 and striker plate 36 are spaced apart sufficiently so that when the locking pin 34 is withdrawn by energizing the solenoid 13, ample movement is permitted of the locking bar 38 between the guide plate 35 and the striker plate 36 incident to adjusting movements of the mirror operating arm 44. The locking bar 38 is preferably provided with a series of spaced perforations 45, one of which will be set to register with the opening in the guide plate 35 and striker plate 36 after adjusting movement of the mirror has been completed by the action of the section solenoid 11.

A coil spring is wound in a suitable number of convolutions around the locking pin 34 between the solenoid 13 and the guide plate 35. One end of this spring will abut against the end of the solenoid 13, while the other end will be affixed to the locking pin 34. The action of solenoid 13, when energized, will be to draw in its core pulling the locking pin 34 out of the perforations in the striker plate 36 and locking bar 38 so as to free the apparatus for the adjusting movement of the mirror 3 through the action of the solenoid 11. After the adjustment and after the return of the tractor to straight line position, the solenoid 13 is de-energized and the spring 37 will become effective to drive the locking pin outwardly to the projected position in which it re-engages alined perforations of the locking plate 38 and of the striker plate 36. It will be understood that, if desired, a manual switch in the cab accessible to the operator may be provided to afford a manual adjustment of the mirror quite independently of the automatic operation.

In operation, the mirror 3 is pre-adjusted and locked in place by the locking pin 34 shown more particularly in FIGURE 5. As the relative position of the tractor 1A to the trailer 2A is changed accompanied by rotary movement of the fifth wheel 5, the contact $6^d$ will first enter beneath the contact bar $9^a$ closing the circuit through the locking solenoid 13 and withdrawing the locking pin 34 from its engagement with the striker plate and the locking bar 38: whereupon the mirror is free to be adjusted.

As the fifth wheel 5 continues to turn in a clockwise direction, as viewed in FIGURE 2, the contact $6^a$ will next move beneath and into electrical contact with the arcuate electrical conducting bar 9 establishing the circuit from the battery through conductor 14, bar 9, contact $6^a$ and lead $12^a$, solenoid section $11^a$, lead $16^a$ and the conductor 15 back to the other side of the battery. The core 19 is thus drawn into a completely included position within the solenoid section $11^a$.

As the rate of turn is increased, contact $6^b$ will also be brought into contact with the conducting bar 9 thus holding the circuit through the solenoid section $11^a$ and establishing a circuit also through the solenoid section $11^b$. Such movement communicated to the plunger rod 20 effects a further prescribed angular movement of the mirror.

As the rate of turn is further increased, the fifth wheel and its arcuate plate 6 moves to a further position beneath the conducting bar 9 so that contact $6^a$ moves off the far end of such contact bar 9 and causes opening of the circuit through $12^a$, de-energizing the coil $11^a$ of the solenoid 11. The core 19 becomes now centered in coil $11^b$ drawing the magnetic plunger 19 fully within the coil $11^b$ which accomplishes a further angular movement of the mirror.

Further turning of the tractor will result in contact $6^c$ being brought into electrical engagement with the conducting bar 9 while contact $6^b$ also remains in contact with the bar 9 thus simultaneously energizing solenoid coils $11^b$ and $11^c$ and drawing the core 19 to a position between such coils.

Further turning movement of the tractor will result in the moving of contact $6^b$ off the far end of conducting bar 9 thus opening the circuit through solenoid section $11^b$ while maintaining the circuit through the coil $11^c$ which is effective to move the core 19 to a centered position wholly within the coil section $11^c$.

Thus the core 19 is capable of five separate positions in a three-section solenoid 11, resulting in five separate angular positions of the mirror.

By adding to or subtracting sections of the solenoid 11 a wide or narrow range of adjustment may be achieved.

In other words, additional coils added to the solenoid 11 will contribute further step-by-step movements of the magnetic core 19 so as to impart to the mirror further increments of angular movements.

These various steps are reversed when the tractor and trailer straighten out after the turn is completed.

During all such movements the contact $6^d$ will remain in contact with the more elongated conducting bar $9^a$ and hence circuit through the locking solenoid 13 is maintained throughout all turning movements of the tractor so that the locking device does not interfere with the various angular positional adjustments of the mirror. However, when the tractor straightens out the contact 6$^d$ will move off the conducting bar 9$^a$ causing the circuit through the locking solenoid 13 to be opened and thereupon freeing locking pin 34 and its spring 37, which latter will then project the pin 34 outwardly through the perforation of the locking bar 38 which has been brought into registry with the opening in the striker plate 36, whereby the locking pin 34 will again re-engage both locking bar and striker plate to maintain the adjustment of the mirror 3 which has been originally established for straight line driving.

Angular movement of the mirror as shown at 3A and 4A in FIGURE 1 may also be controlled by a manual switch 43 located within easy reach of the driver in the cab.

The multi-positioned solenoid 11 may be made with two or as many coils as needed. The number of coils determine the amount of travel of the magnetic plunger 19 and hence of angular movement in the mirror.

The multi-positioning solenoid 11 may thus take the place of a motor at a greatly reduced cost.

The invention is adaptable to standard type rear view mirrors and conventional mirror supporting brackets. The device according to the invention may be easily installed in connection with such conventional mirrors and brackets.

The series of perforations 32 gives easy adjustment of the plunger rod 20 to the mirror arm 44 for different length trailers.

As shown in FIGURE 2 the arcuate insulating plate 6 may be in the form of angle iron construction which may be bolted or otherwise secured to the fifth wheel 5. On this plate are electric contacts, three in number, according to the illustration, but it will be understood that there will be one contact and one circuit for each of the coils of the solenoid 11.

The electrical conducting bars 9 and 9$^a$ are attached to the kingpin plate 7 in such a manner that they will close the fifth wheel contacts 6$^a$, 6$^b$ and 6$^d$ while making a right-hand turn and such contact bars 9 and 9$^a$ are located so they will not interfere with the movements of the fifth wheel, or while connecting or disconnecting a tractor and trailer.

As indicated in FIGURE 2 and shown more fully in FIGURE 4, a pilot stem 19$^a$ of non-magnetic material is affixed to the rear end of the magnetic core member 19 which will act as a guide to assist in stabilizing the rectilinear movements of the magnetic core 19 and the non-magnetic plunger rod 20. As indicated in FIGURE 2, the sections 19, 19$^a$ and 20 are detachable for convenience of assembly.

What is claimed is:

1. For use in a tractor-trailer combination having complemental parts relatively movable in response to turning movements of the tractor, one complemental part being the fifth wheel carried by the tractor and the other complemental part being the kingpin plate carried by the trailer, and a rear vision mirror angularly movable about an upright axis from an outrigger bracket affixed to the cab of the tractor, an automatic mirror positioning device comprising:
    (a) a mirror turning member in operative relation to the mirror for effecting angular movements of the mirror,
    (b) operating means connected to the member for imparting movements to the member and the entrained mirror back and forth through successive increments of angular displacement dependent upon degrees of turning radii of the tractor relatively to the trailer, and
    (c) control means mounted to said complemental parts for regulating the degrees of movement of the operating means as determined by the degrees of relative movements of the complemental parts, said operating means comprising
    (d) an electromagnetic device comprising
    (e) a movable core with which the mirror turning member is entrained,
    (f) a sectional solenoid having a number of successive windings, said core being movable through successive windings pursuant to the action of the control means, said control means comprising
    (g) spaced insulated electrical contacts mounted to one complemental part,
    (h) an insulated electrical conducting bar mounted to the other complemental part and adapted to be successively contacted by the electrical contacts incident to relative movement of the complemental parts, and
    (i) normally open electrical circuits each including a winding of the sectional solenoid, one of the contacts and the conducting bar closable in succession as the contacts and conducting bar are brought into electrical engagement by the action of the complemental parts.

2. An automatic mirror positioning device as claimed in claim 1 further comprising
    (j) locking mechanism biased to a locked condition position for locking the mirror against angular positioning movements,
    (k) unlocking mechanism associated with the control means for unlocking the locking mechanism preliminary to commencement of operative action of the operating means,
    (l) one said mechanism mounted to the mirror turning member and the other said mechanism mounted to the mirror bracket.

3. An automatic mirror positioning device as claimed in claim 2 in which the locking mechanism comprises
    (m) a reciprocating locking pin,
    (n) a locking perforated striker member positioned on the mirror turning member for receiving the pin,
    (o) means on the mirror turning member for moving the pin into and out of engagement with the striker member,
    (p) a locking bar on the bracket having a series of perforations adapted to register with the perforation of the striker member in any angularly adjusted position of the striker member whereby also to receive the pin through any perforation of the striker member.

4. For use in a tractor-trailer combination having a fifth wheel on the tractor and a kingpin plate on the trailer relatively movable in response to turning movements of the tractor and a rear vision mirror angularly movable about an upright axis from an outrigger bracket affixed to the cab of the tractor, an automatic mirror positioning device operated by the turning movements of the tractor and comprising
    (a) a mirror turning member in operative relation to the mirror for effecting angular movement of the mirror,
    (b) operating means connected to said member for imparting movements to the member and the entrained mirror back and forth through successive increments of angular displacement dependent upon degrees of turning radii of the tractor relative to the trailer comprising
    (c) a sectional solenoid having a number of successive windings, and
    (d) a core connected to the mirror turning member movable through the successive windings,
    (e) control means for regulating the degrees of movement of the operting means as determined by the degree of relative movement of the fifth wheel and the kingpin plate and including
    (f) an insulating plate element carrying
    (g) a number of spaced apart electrical contacts,
    (h) an insulated electrical conducting bar element adapted to be successively contacted by the electrical contacts incident to relative movement of the fifth wheel and the kingpin plate, (i) one of said elements being mounted on the fifth wheel (j) the other of said elements being mounted on the kingpin plate, and (k) normally open electrical circuits each including a winding of the sectional solenoid, one of the contacts and the conducting bar element closable in succession as the contacts and conducting bar element are brought into electrical engagement by the action of the fifth wheel and the kingpin plate.

References Cited
UNITED STATES PATENTS

| | | | |
|---|---|---|---|
| 3,059,539 | 10/1962 | Meade | 350—281 |
| 3,075,431 | 1/1963 | White | 350—289 |
| 3,166,630 | 1/1965 | Esslinger | 350—307 X |

FOREIGN PATENTS 499,802  1/1939  Great Britain.

DAVID SCHONBERG, Primary Examiner

J. W. LEONARD, Assistant Examiner

U.S. Cl. X.R.

74—105, 527; 350—299, 307